(12) United States Patent
Park et al.

(10) Patent No.: US 6,838,788 B2
(45) Date of Patent: Jan. 4, 2005

(54) MOTOR STRUCTURE FOR RECIPROCATING COMPRESSOR

(75) Inventors: Jung Sik Park, Seoul (KR); Jin Dong Kim, Gunpo (KR)

(73) Assignee: LG Electronics Inc., Seoul (KR)

( * ) Notice: Subject to any disclaimer, the term of this patent is extended or adjusted under 35 U.S.C. 154(b) by 68 days.

(21) Appl. No.: 10/077,876

(22) Filed: Feb. 20, 2002

(65) Prior Publication Data

US 2002/0113500 A1 Aug. 22, 2002

(30) Foreign Application Priority Data

Feb. 21, 2001 (KR) .......................................... 2001-8734

(51) Int. Cl.⁷ ............................................. H02K 41/00
(52) U.S. Cl. ........................... 310/12; 310/15; 417/415; 417/417.1; 417/417
(58) Field of Search ............................. 310/12–35, 37, 310/218, 215, 43, 45, 194; 417/415, 417.1, 417; H02K 1/18

(56) References Cited

U.S. PATENT DOCUMENTS 3,903,438 A * 9/1975 Dolz ........................... 310/27
6,077,054 A * 6/2000 Lee ............................. 417/417

FOREIGN PATENT DOCUMENTS

EP 0145058 * 6/1995 ........... F04B/35/04

* cited by examiner

Primary Examiner—Dang Le
Assistant Examiner—Iraj A. Mohandesi
(74) Attorney, Agent, or Firm—Birch, Stewart, Kolasch & Birch, LLP

(57) ABSTRACT

A motor structure for a reciprocating compressor, by which an power lowering of the motor can be prevented by installing a magnet to be eccentric toward a direction compressing a fluid to compensate a backward moved amount of the magnet by compression pressure during operating the compressor and a motor saturation can be prevented, comprises: an outer core of cylindrical shape fixed inside a sealed chamber and including a winding coil wound therein; an inner core disposed on an inner circumferential surface of the outer core with a predetermined gap for forming a flux with the outer core when an electric source is applied to the winding coil; and a magnet disposed between the outer core and the inner core so as to move linearly for making a piston to perform a linear reciprocating movement, wherein an initial mid position of the magnet is located to be eccentric as a predetermined distance from a mid position of the outer core and of the inner core toward a moving direction of the piston when a fluid is compressed.

9 Claims, 2 Drawing Sheets

MOTOR STRUCTURE FOR RECIPROCATING COMPRESSOR

BACKGROUND OF THE INVENTION

1. Field of the Invention

The present invention relates to a reciprocating compressor, and particularly, to a motor structure for a reciprocating compressor by which power lowering of a motor generated by a phenomenon that a piston is backward moved when a fluid is compressed can be prevented.

2. Description of the Background Art

Generally, a compressor is a device for compressing fluid such as refrigerant gas. The compressor can be classified into a rotary compressor, a reciprocating compressor, and a scroll compressor.

The compressor comprises: a sealed chamber, a motor installed inside the chamber for generating driving force when an electric source is applied from outer part, and a compression part for performing compressing operation of the fluid by being applied the driving force of the motor.

FIG. 1 is a partial cross-sectional view showing a motor of a reciprocating compressor according to the conventional art.

The motor of the reciprocating compressor according to the conventional art comprises: an outer core 102 of cylindrical form fixed inside the chamber (not shown); an inner core 106 disposed with a predetermined gap between an inner circumferential surface of the outer core 102 and fixed on an outer circumferential surface of a cylinder 104; a winding coil 108 wound on inner side of the outer core 102 and being applied the electric source from outer part; and a magnet 110 disposed between the outer core 102 and the inner core 106 with a predetermined intervals for performing linear reciprocating movement when the electric source is applied to the winding coil 108.

The outer core 102 includes a opening recess 112 formed in circumferential direction so that the winding coil 108 is disposed on an intermediate portion of the inner circumferential surface of the outer core 102, and a path portion on which flux flows when the electric current is applied on the winding coil 108 is formed in boundary direction of the opening recess 112. Both end parts of the inner circumferential surface of the outer core 102 which is divided by the opening recess 112 form a pole part 114.

The inner core 106 is formed as a cylinder fixed on the outer circumferential surface of the cylinder 104, and a length of the inner core 106 is formed to be same as that of the outer core 102.

A plurality of magnet 110 are disposed on a magnet holder 116 which is located between the inner core 102 and the outer core 106 in circumferential direction with a certain intervals therebetween. An center part of the magnet 110 is disposed to be in a same line (M) with a center part of the outer core 102, and the both end parts of the magnet 110 are disposed to be located on intermediate parts of the pole part 114.

The magnet holder 116 is integrally connected to a piston 120 which is disposed to perform linear reciprocating movement inside the cylinder 104, and thereby, when the magnet 110 undergoes the reciprocating movement, the magnet holder makes the piston 120 perform the reciprocating movement with same strokes as the magnet 110. In addition, return springs (not shown) are installed on both sides of the magnet holder 116 for providing an elastic force when the piston 120 performs the reciprocating movement, and for setting the location of the magnet holder 116 to the original position when the motor is stopped.

At that time, a maximum stroke of the piston 120 is decided within a range of interaction between a flux generated from the magnet 110 and a flux generated between the outer core 102 and the inner core 106.

A compression part 118 is installed on an end part of the cylinder 104 for performing the compressing operation of the fluid according to the reciprocating movement of the piston 120.

As shown in FIG. 2, according to the conventional motor of the reciprocating compressor, when the electric power is applied to the winding coil 108, the flux is formed around the winding coil 108 and the flux forms a closed loop along with the outer core 102 and the inner core 106. And the magnet 110 is linearly moved to axial direction by the interaction between the flux generated between the outer core 102 and the inner core 106 and the flux generated by the magnet 110.

In more detail, the magnet 110 maintains its initial mid position by the elastic force of the return spring when the motor is in stopped state, and the both end parts are located on intermediate parts of the path portion 114.

In that state, when the electric current is applied on the winding coil 108 to one direction, the flux formed between the outer core 102 and the inner core 106 is flowed to A direction in FIG. 2. Then, the magnet 110 is linearly moved to C direction in FIG. 2 by the interaction with the flux formed between the outer core 102 and the inner core 106, and accordingly, the piston 120 is moved forward to perform the compression operation of the fluid.

In addition, when the electric current is applied on the winding coil 108 to the other side, the flux formed between the outer core 102 and the inner core 106 is flowed to B direction in FIG. 2. Then, the magnet 110 is linearly moved to D direction in FIG. 2 by the interaction between the flux flowing between the outer core 102 and the inner core 106 and the flux formed by the magnet 110, and accordingly, the piston 120 is retrieved to suck the fluid.

Herein, in case that the reciprocating compressor is operated in that ideal condition, the magnet 110 is reciprocatingly moved within the stroke (P) range, however, in actual operation of the motor, the piston 120 may be moved to the opposite direction of the compression part 118 by difference between the compression pressure and the sucking pressure of the fluid, and then, the magnet 110 is reciprocatingly moved within an actual stroke (Q) range out of the ideal stroke (P) range.

As described above, if the mid position of the magnet is escaped from the initial mid position, the power of the motor is lowered and motor saturation may be generated. In addition, if the magnet deviates from the pole part, the system becomes unstable and it can not be controlled.

SUMMARY OF THE INVENTION

Therefore, an object of the present invention is to provide a motor structure for a reciprocating compressor in which a magnet is installed to be eccentric toward a direction of compressing fluid to compensate a backward moved amount of the magnet by a compressing pressure during the compressor is operated, and thereby a motor saturation generation can be prevented.

To achieve the object of the present invention, as embodied and broadly described herein, there is provided a motor structure for a reciprocating compressor comprising: an outer core fixed inside a sealed chamber and including a winding coil wound therein; an inner core disposed on an inner circumferential surface of the outer core for forming a flux with the outer core when an electric source is applied to the winding coil; and a magnet disposed between the outer core and the inner core so as to perform a linear movement for making a piston perform a linear reciprocating movement.

And an initial mid position of the magnet is located to be eccentric from a mid position of the outer core and of the inner core toward a direction that the piston is moved during compressing the fluid.

An eccentric amount of the magnet in the motor structure for the reciprocating compressor according to the present invention is same as a moved distance of the piston toward an opposite direction of compressing direction when the fluid is compressed.

An initial mid position of the compressed portion on the piston which is connected to the magnet and moved together with the magnet is located to be eccentric a predetermined distance from a center between a top dead center and a bottom dead center through which the fluid is compressed and sucked toward the top dead center.

An eccentric amount of the piston is same as a moved distance of the piston toward an opposite direction of the compressing direction when the fluid is compressed.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

There may be a plurality of embodiments for a motor in a reciprocating compressor according to the present invention, and the most preferred embodiment will be described as follows.

Figure 1:
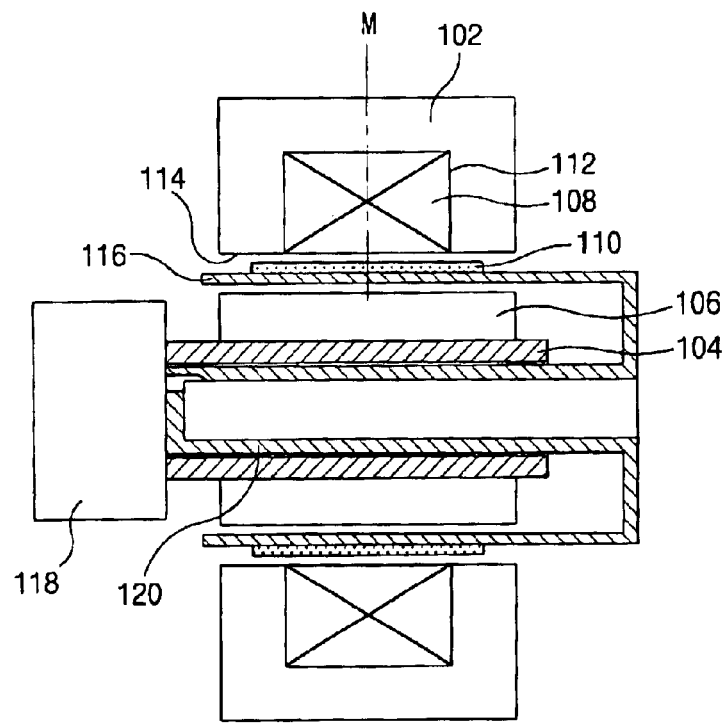
FIG. 1 is a cross-sectional view showing a motor in a reciprocating compressor according to the conventional art.
Figure 2:
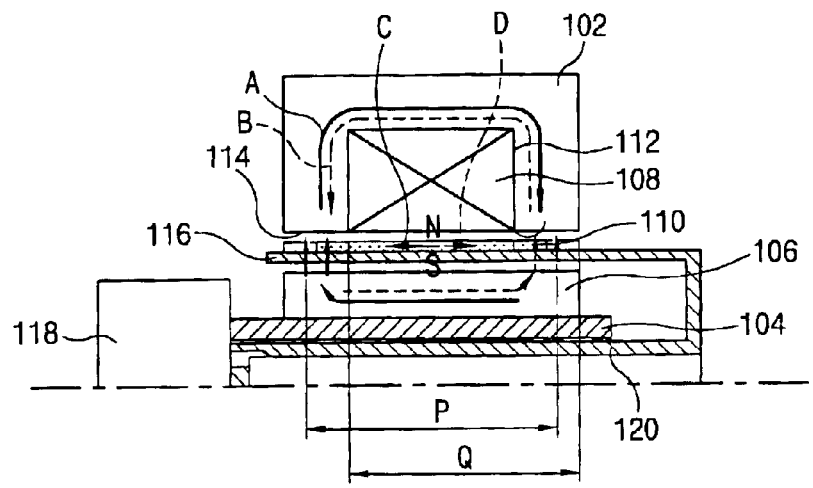
FIG. 2 is a cross-sectional view showing an operating state of the motor for the reciprocating compressor according to the conventional art.
Figure 3:
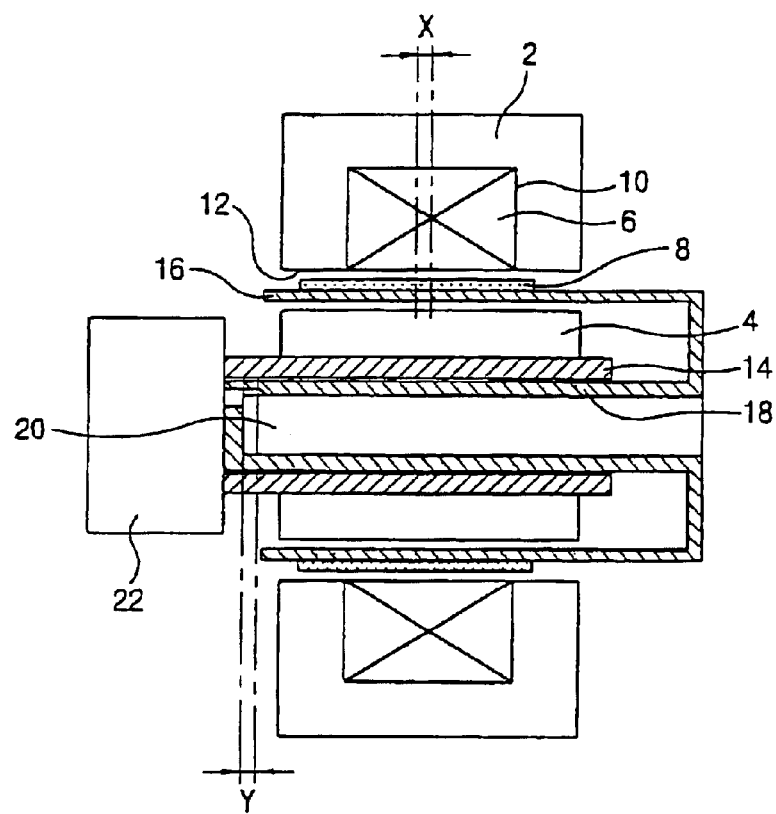
FIG. 3 is a cross-sectional view showing a motor for a reciprocating compressor according to the present invention.

FIG. 3 is a cross-sectional view showing the motor for the reciprocating compressor according to the present invention.

The motor for the reciprocating compressor according to the present invention comprises: an outer core 2 of cylindrical shape fixed inside a sealed chamber (not shown); an inner core 4 disposed on an inner circumferential surface of the outer core 2 with a predetermined gap for forming a flux with the outer core 2; a winding coil 6 wound on inner part of the outer core 2; and a magnet 8 disposed between the outer core 2 and the inner core 4 so as to move linearly.

The outer core 2 has a opening recess 10, on which the winding coil 6 is wound, formed on an intermediate part of the inner circumferential surface of the outer core 2, and a path portion on which the flux flows when the electric power is applied to the winding coil 6 is formed on boundary portion of the opening recess 10. In addition, pole parts 12 are formed on both sides of the inner circumferential surface of the outer core 2 which is divided by the opening recess 10.

The inner core 4 is formed as a cylinder fixed on an outer circumferential surface of a cylinder 14, and a length of the inner core 4 is formed to be same as that of the outer core 2.

The magnet 8 is installed on a magnet holder 16 located between the outer core 2 and the inner core 4, and is divided into a plurality of bits installed with a predetermined gaps on the magnet holder 16.

The magnet holder 16 is connected to a piston 18 which is moved linearly inside the cylinder 14 for moving the piston 18 linearly when the magnet 8 is moved linearly.

The piston 18 of hollow shape includes a fluid suction hole 20, and one end part of the piston 18 is connected to the compression part 22 disposed on one side of the cylinder 14 and the other end part of the piston 18 is connected to the magnet holder 16. Therefore, the piston 18 is linearly reciprocated according to the reciprocating movements of the magnet 8 to suck the fluid through the fluid suction hole 20 and to compress the sucked fluid.

Herein, the magnet 8 is backward moved by compression force when the piston 18 is linearly reciprocated to perform the compression, and it is located to be eccentric as a predetermined distance (X) from the center of the outer core 2 toward the compression part 22.

That is, the center of the magnet 8 is eccentric from the centers of the outer core 2 and of the inner core 4 as a predetermined distance (X), and accordingly, both end parts of the magnet 8 are disposed to be eccentric from the center of the pole part 12 toward the compression part 22.

In addition, the end part of the piston 18 for functioning the compression operation is located to be eccentric as a predetermined distance (Y) from the intermediate position between the top dead center and the bottom dead center, which make the ideal stroke range of the piston, toward the top dead center.

It is desirable that the eccentric amount of the magnet 8 is same as the moving distance of the piston 18 toward the opposite direction of the compression direction by the compressing force when the compressor compresses the fluid.

Operation of the reciprocating compressor constructed as above will be described as follows.

In case that the motor is in the stopped state, the magnet 8 is located to be eccentric as a predetermined distance (X) from the center position of the outer core 2 and the inner core 4 toward the compressor, and the piston 18 is located to be eccentric as the above predetermined distance (Y) from the center position of the top dead center and the bottom dead center toward the top dead center direction.

Figure 4:
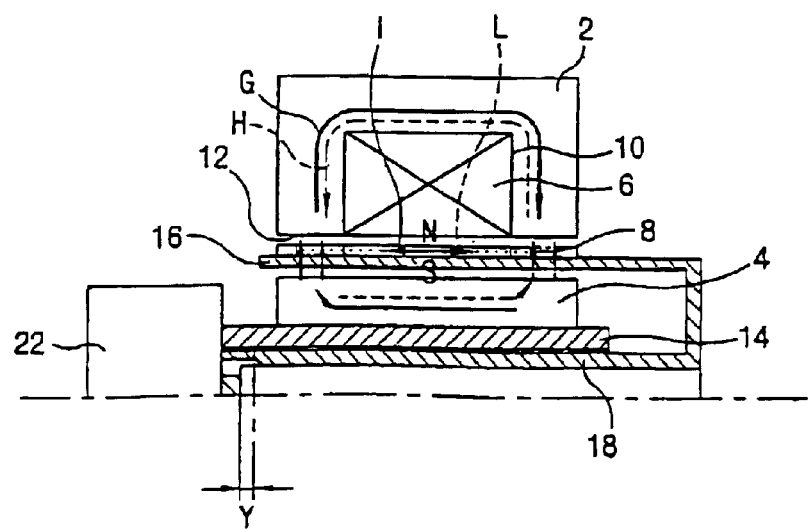
FIG. 4 is a cross-sectional view showing an operating state of the motor for the reciprocating compressor according to the present invention.

In the above state, as shown in FIG. 4, when forward electric source is applied to the winding coil 6, the flux flows toward direction (G) between the outer core 2 and the inner core 4. In addition, as shown in FIG. 4, the magnet 8 is moved toward direction (I) by an interaction between the flux flowing toward direction (G) and the flux generated from the magnet 8, and accordingly, the piston 18 is proceeded to compress the fluid.

In addition, as shown in FIG. 4, when a reverse electric source is applied to the winding coil 6, the flux flows to direction (H) between the outer core 2 and the inner core 4. In addition, as shown in FIG. 4, the magnet 8 is moved toward direction (L) by an interaction between the flux flowing toward the direction (H) and the flux generated from the magnet 8, and accordingly, the piston 18 is retrieved to perform the suction operation of the fluid.

At that time, the piston 18 is moved toward an opposite direction of the compressing direction by the compressing force during the compressing operation, and the initial position of the magnet 8 is located to be eccentric toward the compressing direction, and therefore, the center of the magnet 8 is accorded with the center of the outer core 2 and the inner core 4 when the compressor is operated actually.

That is, the initial mid position of the magnet 8 is located to be eccentric from the center of the outer core 2 and of the inner core 4 toward the compressing direction, and therefore, the magnet 8 is backward moved as the backward moved amount of the piston 18 when the compressor is actually operated. Therefore, the both end parts of the magnet 8 are accorded with the center of the pole part 12 when the compressor is actually operated.

Effect of the reciprocating compressor constructed and operated as above will be described as follows.

The initial mid position of the magnet is located to be eccentric as a predetermined distance from the center of the outer core and of the inner core toward the compressing direction, and the initial mid position of the compression part of the piston is located to be eccentric as a predetermined distance from the center of the top dead center and the bottom dead center toward the top dead center direction. Therefore, the backward moved amount is compensated toward the opposite direction of the compressing direction of the piston by the compressing force when the compressor is actually operated, and thereby the mid position of the magnet is accorded with the mid position of the outer core and of the inner core to prevent the function deterioration of the motor.

Especially, a reluctance force which is generated when the magnet is located on a pole end of the outer core and of the inner core during compressing operation can be minimized, and the function of the motor can be improved by minimizing the ineffective flux. In addition, an out of control phenomenon which may be generated if the magnet is digressed from the pole part can be prevented.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A motor structure for a reciprocating compressor comprising:
    an outer core of cylindrical shape fixed inside a sealed chamber and the outer core including a winding coil wound therein;
    an inner core disposed on an inner circumferential surface of the outer core with a predetermined gap for forming a flux with the outer core when an electric power is applied to the winding coil; and
    a magnet disposed between the outer core and the inner core so as to move linearly for making a piston perform a linear reciprocating movement,
    wherein an initial mid position of the magnet is located to be eccentric at a predetermined distance from a mid position of the winding coil toward a moving direction of the piston when a fluid is compressed.

2. A motor structure for a reciprocating compressor comprising:
    an outer core of cylindrical shape fixed inside a sealed chamber and the outer core including a winding coil wound therein;
    an inner core disposed on an inner circumferential surface of the outer core with a predetermined gap for forming a flux with the outer core when an electric power is applied to the winding coil; and
    a magnet disposed between the outer core and the inner core so as to move linearly for making a piston to perform a linear reciprocating movement,
    wherein an initial mid position of the magnet is located to be eccentric at a predetermined distance from a mid position of the outer core and of the inner core toward a moving direction of the piston when a fluid is compressed,
    wherein an eccentric amount of the magnet is the same as a moved distance of the piston toward an opposite direction of the compressing direction when the fluid is compressed.

3. A motor structure for a reciprocating compressor comprising:
    an outer core of cylindrical shape fixed inside a sealed chamber and the outer core including a winding coil wound therein;
    an inner core disposed on an inner circumferential surface of the outer core with a predetermined gap for forming a flux with the outer core when an electric power is applied to the winding coil; and
    a magnet disposed between the outer core and the inner core so as to move linearly for making a piston to perform a linear reciprocating movement,
    wherein an initial mid position of the magnet is located to be eccentric at a predetermined distance from a mid position of the outer core and of the inner core toward a moving direction of the piston when a fluid is compressed,
    wherein an initial mid position of a compressed part on the piston which is connected to the magnet and moved with the magnet is located to be eccentric at a predetermined distance from a center between a top dead center and a bottom dead center through which the fluid is sucked and compressed toward the top dead center direction.

4. The structure of claim 3, wherein an eccentric amount of the piston is the same as a moved distance of the piston toward an opposite direction of the compressing direction when the fluid is compressed.

5. The structure of claim 1, wherein an eccentric amount of the magnet is the same as a moved distance of the piston toward an opposite direction of the compressing direction when the fluid is compressed.

6. The structure of claim 1, wherein an initial mid position of a compressed part on the piston which is connected to the magnet and moved with the magnet is located to be eccentric at a predetermined distance from a center between a top dead center and a bottom dead center through which the fluid is sucked and compressed toward the top dead center direction.

7. A motor structure for a reciprocating compressor comprising:
- an outer core of cylindrical shape fixed inside a sealed chamber and the outer core including a winding coil wound therein;
- an inner core disposed on an inner circumferential surface of the outer core with a predetermined gap for forming a flux with the outer core when an electric power is applied to the winding coil; and
- a magnet disposed between the outer core and the inner core so as to move linearly for making a piston to perform a linear reciprocating movement in order to compress fluid in a compression part, wherein an initial mid position of the magnet is located to be eccentric at a predetermined distance from a mid position of the winding coil toward the compression part.

8. The structure of claim 7, wherein an eccentric amount of the magnet is the same as a moved distance of the piston toward an opposite direction of the compressing direction when the fluid is compressed.

9. The structure of claim 7, wherein an initial mid position of a compressed part on the piston which is connected to the magnet and moved with the magnet is located to be eccentric at a predetermined distance from a center between a top dead center and a bottom dead center through which the fluid is sucked and compressed toward the top dead center direction.

* * * * *